Nov. 16, 1965    J. P. CHISHOLM    3,218,556
SPECTRUM CENTERED RECEIVER
Filed March 29, 1963    2 Sheets-Sheet 1

INVENTOR
JOHN P. CHISHOLM
BY Alexander & Dowell
ATTORNEY

United States Patent Office 3,218,556
Patented Nov. 16, 1965

3,218,556
SPECTRUM CENTERED RECEIVER
John P. Chisholm, Buffalo, N.Y., assignor to Sierra Research Corporation, a corporation of New York
Filed Mar. 29, 1963, Ser. No. 268,923
8 Claims. (Cl. 325—303)

This invention relates to improvements in interference and noise reduction means for receivers, and more particularly relates to novel receiver means having plural signal paths, one of which is tuned to receive desired signals centered in the main passband, and others of which are tuned to form a composite passband to receive frequencies which are contiguously located about the main passband, and this composite passband having a notch in its characteristic, located at the main signal passband and substantially coextensive therewith. This novel receiver means is coupled to an output through gating means which are controlled to pass a signal whenever the received main-passband signal energy is greater than the received auxiliary-passband signal energy taken from the composite passbands located on either side of the main passband. On the other hand, the gating means serve to block the passage of signals to the output whenever the energy in the auxiliary passbands exceeds the amplitude in the main passband.

Although the present invention has utility when used with a great variety of different types of receivers, not only of R.F. energy but also of sonic and supersonic energy, for instance in connection with sonar systems, the present invention will be described particularly with reference to an embodiment in which the receiver means is part of a radar. In this case, the main passband is tuned to the output frequency of the radar transmitter either manually, or else by automatic means, so that it may be assumed hereinafter that the main passband is exactly centered with respect to the frequency of the radar transmitter's output pulse. In modern equipment, the main passband of a radar receiver is relatively narrow, often comprising about a four megacycle bandwidth which, in a 5600 megacycle radar system, is broad enough to encompass substantially all of the energy in a 0.25 microsecond pulse from the magnetron in the radar transmitter.

The most usual type of interference caused by other equipment operating in relatively close proximity involves a spectrum of undesired signals the center of which (if any) is usually offset somewhat from the center passband of the present radar, or else can be deliberately offset therefrom by retuning the magnetron and the receiver in the present apparatus. The present invention is based upon the fact that, in the usual case, the spectrum of the desired radar returns will be centered about the receiver passband, but that the spectrum of the undesired returns will be offset therefrom and will tend to arrive at a different center frequency. The difference between the desired radar signal and the undesired offset signal is particularly well illustrated if the undesired signal is created by a magnetron, for example operating in another radar in the same radar band. The output from the magnetron is not a clean signal at one frequency, but includes what is known in the art as magnetron splash which is usually at about —30 to —45 db with respect to the principal output signal. This magnetron splash creates interference which is roughly uniformly distributed across the passbands of a nearby similar radar receiver and this is the principal type of interference which makes it difficult for plural similar radars to operate in the same geographic area. Magnetron splash is, of course, not the only type of interference which tends to be distributed over a relatively wide spectrum, other electrical noises generally having such distribution characteristics.

The present novel receiver means operates on the assumption that since the total bandwidth of the two auxiliary paths which border the main passband is greater than the bandwidth of the main passband, in the absence of a desired signal, the total energy received in the contiguous paths be equal to or greater than the total energy received in the main passband, since the interfering spectrum is distributed about equally over both. On the other hand, when a desired signal is received in the main passband, the energy in the main signal path will become greater than the energy in the two contiguous paths. Therefore, if gating means are provided between the radar receiver and the video circuits, this gating means can remain blocked as long as the energy in the composite contiguous paths exceeds the energy in the main passband, but the gating means will be rendered conductive whenever the energy in the main passband exceeds the energy in the contiguous passbands. In this way, the desired signals are not discriminated against when they are present and are able to mask the accompanying spurious noise components, but no signals are passed to the video section during intervals of time when a desired signal is absent and the passbands receive only interference signals which have no dominant energy component squarely in the center of the main passband.

It is a principal object of this invention to provide a novel and improved receiver system for passing desired signals while blocking noise signals occurring during time intervals between the desired signals by using the fact that the energy caused by a desired signal is always less outside of the main passband than within it, and that noise components outside of the passband are equal to or greater than the noise components inside the passband, assuming that the main frequency of the device causing the noise is offset to any extent, however small, from the main passband of the receiver. There are several possible embodiments for such a system, one embodiment including plural complete receivers wherein one receiver is tuned to the main passband and comprises the receiver which ordinarily appears in a radar system. In addition, either two auxiliary receivers must be added to cover both contiguous signal paths, one tuned to each path, or else a single auxiliary receiver could be provided having a passband which is wide enough to cover both contiguous signal paths, but provided with a notch in the center of its characteristic corresponding substantially in frequency and bandwidth with the pass characteristic of the main signal path. Still another embodiment includes the case where three of the signal paths would be covered by a single receiver front end and mixer unit, but feeding differently tuned I.F. strips.

It is another extremely important object of the present invention to provide a novel receiver system which examines the spectrum of the input signals both at the center of the passband and also in contiguous passbands, and gates the receiver off whenever the amplitude in the latter exceeds the amplitude in the former, a principal advantage of this system being that whenever the gate means is passing desired signals, the system performance with respect thereto is not degraded.

It is still another object of this invention to provide a novel gating circuit for interrupting the main signal channel from the receiver when the amplitude of the off-frequency signals exceeds the amplitude in the desired signal passband.

Another important object is to provide a comparison means which can operate over a wide range of signal levels without being rendered inoperative by output-signal saturation.

The applicant is aware of other receiver systems such as that shown in Patent 2,538,040 wherein an effort is made to discriminate between several different frequency spectra each having a center frequency at least partially included within the passband of the receiver, which is relatively broad, and using a discriminator to develop a signal which blanks the output of the receiver in response to interfering signals which are offset enough from the main signal so that they can be considered as unsymmetrically located with respect to the center of the receiver's passband. This prior art showing represents a different technique which will work with signals having a center frequency only slightly offset from the desired signals, but still within a relatively broad passband of a receiver, but this is not the same type of interference as that to which the present invention is addressed. Such prior-art technique is not effective in combating the type of interference which results from a signal spectrum having a center frequency located outside of the main passband of the receiver and having many spurious frequencies distributed over many megacycles on each side of the central frequency of the greatest energy content. The present system is effective to eliminate signals resulting from such a spectrum where its central frequency is located so far outside of the main passband that a discriminator will not be responsive to it, and where there are so many interfering components relatively evenly distributed across the main passband and the contiguous passbands that the net output of a discriminator would be zero. In other words, the distribution of interference of this sort, being evenly distributed across the entire received passband cannot be identified by the use of a discriminator, but is readily identified by the present novel system. Another teaching of a discriminator-type of prior art system is contained in Patent 2,489,254.

Another prior art type of system which is basically different from the present system is illustrated in Patent 3,015,026 which provides a technique for minimizing the effects of a swept-frequency jamming signal. This patent teaches the use of two "guard receivers," one tuned to a frequency above, and the other to a frequency below the frequency of the principal passband. If a swept-frequency jamming signal passes through the band of one of the guard receivers, the main-passband receiver is turned off and is then turned back on by passage of the jamming signal through the other guard signal receiver. However, this system would not be effective for eliminating interfering signals having approximately uniform energy distribution over the composite bandwidth of all of the receivers.

Other objects and advantages of the present invention will become apparent during the following discussion of the drawings, wherein.

Figure 1:
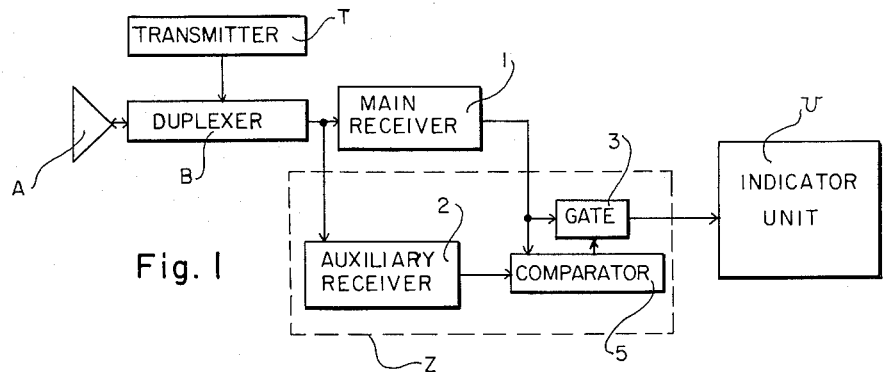
FIG. 1 is a block diagram showing a radar system embodying the present novel receiver features.

Referring now to the drawings, FIG. 1 shows an illustrative radar system including an antenna A connected by a duplexer B with a transmitter T and a conventional radar receiver 1, the radar system also including a suitable indicator unit U for displaying the pulse-echo information reaching the indicator unit U through the receiver 1. In FIG. 1, a rectangular zone Z is shown surrounded by a box in dashed lines, and within this zone Z are located a plurality of units which have been added to the conventional radar system illustrated outside the box Z in order to provide it with the novel capabilities of the present invention. Assuming that the main receiver 1 which is located outside of the zone Z comprises the regular radar receiver, an auxiliary receiver 2 is then added, and has its own input connected to the output of the duplexer B. FIG. 1 illustrates an easily-understood embodiment of the invention in which entirely separate receivers are used for the main receiver 1 and the auxiliary receiver 2. This system illustrates how an existing radar could be altered to include the present invention but it is however, not the most economical practical embodiment, and a more sophisticated system will be discussed below in connection with FIG. 5.

Returning to FIG. 1, the output signal from the main receiver 1 is coupled through a gate 3 with the indicator unit U so that when the gate 3 is conductive, the main receiver 1 will deliver signals therethrough to the indicator unit U. The condition of the gate 3 is controlled by the output from a comparator 5, the comparator having two inputs respectively connected to receive the output of the main receiver 1 and of the auxiliary receiver 2. The comparator comprises an ordinary logical circuit of a type which delivers one output when one input signal is greater, and a different output when the other input signal is greater, for example a flip-flop circuit. As mentioned in the objects of the invention, it is the function of the comparator circuit to deliver a control signal to the gate 3 which will block the gate when the output from the main receiver 1 is not greater in amplitude than the output from the auxiliary receiver 2. One suitable embodiment for a comparator and gate circuit will be discussed hereinafter in connection with FIG. 4.

Figure 2:
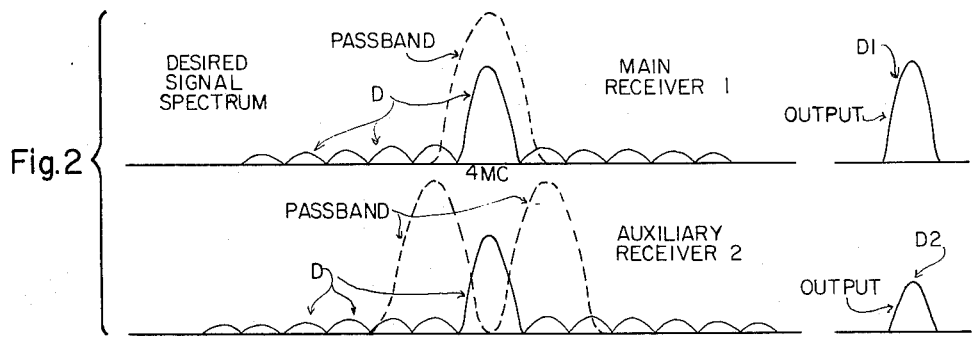
FIGS. 2 and 3 are two graphic diagrams illustrating the output amplitudes obtained from the main and auxiliary receivers for different input signals.
Figure 3:
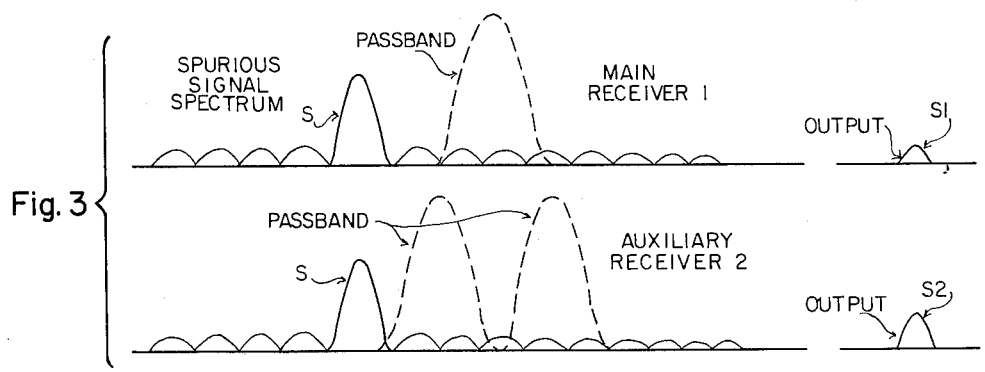

Turning now to FIGS. 2 and 3, it will be noted that each of these figures includes two sets of curves representing in each figure the spectrum of input frequencies distributed along the horizontal axis. The vertical axis indicates amplitude of the signals. In each of these graphical figures, the upper set of curves refers to the main receiver 1 and the lower set of curves refers to the auxiliary receiver 2. Each of the figures includes in dashed lines a curve indicating the passband characteristic of the particular receiver to which the set of curves refers. Since the upper sets of curves in FIGS. 2 and 3 refer to the main receiver 1, its passband characteristic is illustrated in dashed lines as comprising a relatively narrow bandwidth, typically covering about four megacycles total. Moreover, it is assumed at all times to be tuned, either automatically or manually, to the output frequency of the radar transmitter T. The output of a magnetron transmitter, as briefly discussed above, comprises a spectrum rather than a single pure frequency. In other words, the principal energy pulse delivered from the magnetron is delivered at a nominal frequency to which it is tuned, but the magnetron "splash" creates a whole spectrum of other frequencies which amount to a relatively uniformly distributed continuous spectrum extending both up and down from the principal pulse frequency. This magnetron splash is the principal offending source of interference where there are a plurality of radars operating at somewhat different nominal frequencies in the same general band and within a relatively small area. If the magnetrons in each of the radars put out nothing but the principal burst of energy for which they are tuned without substantial off-frequency components, then it would be a simple thing to tune out other radars in the same area so that they would not interfere with each other. However, the magnetron splash cannot be tuned out because it substantially covers the band, and therefore the only way to avoid interference by other radars is to remove them from geographic proximity so that distance will attenuate the undesired frequency spectrum. This is not a practical solution to a problem which exists among plural radars in a single task force, all of which radars must be allowed to operate simultaneously and in such close proximity with other radars as to frequently cause serious mutual interference.

In the present system, as pointed out above, the main receiver has a relatively narrow bandwidth and is always tuned to receive the precise frequency of the system's own radar transmitter. The auxiliary receiver is tuned in such a manner as to be sensitive to incoming signals on frequencies closely adjacent to, but displaced from, the frequency transmitted by its own radar system. Thus, the lower curve, illustrated in both FIGS. 2 and 3 in dashed lines and outlining the band pass characteristic of the auxiliary receiver 2, is provided with double humps separated by a notch, and the notch corresponds exactly in frequency with the transmitter frequency of the present system. FIG. 2 further illustrates the spectrum of desired frequencies D emanating from the system's own transmitter and including its maximum energy concentrated within the passband of the main receiver 1, but having a plurality of magnetron-splash components in its spectrum extending out considerably on both sides of the center frequency to which the system is principally responsive. Assuming that this spectrum is transmitted by the magnetron within the system's transmitter T, the returning echoes comprise a similar spectrum of frequencies as indicated at D in FIG. 2. Note that the principal energy content of the echo is squarely centered within the passband of the main receiver 1, and within the notch between the two spaced passband humps of the auxiliary receiver 2, these passbands each being similar in width to the passband of the main receiver 1, and the notch coinciding generally with the passband of the main receiver 1 and substantially coextensive therewith. The output D1 of the main receiver 1 appears to the right in FIG. 2 and comprises a relatively large signal. On the other hand, the output D2 of the auxiliary receiver 2 is a very much smaller signal because of the fact that the main energy content of the desired signal spectrum falls in the notch between the two passbands and the energy within the two passbands comprises only low-energy components of the desired signal spectrum.

FIG. 3 shows a set of curves similar to those shown in FIG. 2 except that a different spectrum of signal frequencies is introduced into both receivers, this spectrum representing interference from another radar operating within the same band of frequencies but having a magnetron delivering its principal energy components at a frequency which lies outside of the passband of the main receiver 1 of the present system. Therefore, the signal spectrum S is spurious and should be rejected by the present radar system since it was initiated by a transmitter of a differently tuned radar. This time, the output signal S1 of the main receiver 1 is relatively small because of the fact that the only signal components falling within its passband are low-energy components attributable to magnetron splash from the interfering radar. Moreover, the output S2 of the auxiliary receiver 2 is likewise somewhat smaller than in FIG. 2 because of the fact that the main energy components of the spectrum S are offset to one side and therefore the energy within the passbands of the auxiliary receiver 2 all comes from the same side of the spectrum so that the amplitude of the components appearing in the right-hand passband are somewhat smaller than the ones appearing in the left-hand passband. No quantitive comparison is being drawn here between the output S2 of the auxiliary receiver in FIG. 3 and the output D2 of the same receiver in FIG. 2. The significant comparison is between the output S2 of the auxiliary receiver 2 and the output S1 of the main receiver 1. Inasmuch as the area under the two passband characteristics of the auxiliary receiver 2 is greater than the area under the single passband characteristic of the receiver output S1, more energy will be passed to the output by the auxiliary receiver 2 than by the main receiver 1, even assuming that the side spectrum components were uniformly distributed over the composite spectrum of both receivers.

Thus, by comparing FIGS. 2 and 3, it will be seen that where the desired signal spectrum is exactly within the passband of the main receiver 1 the output D1 exceeds the output amplitude D2. On the other hand, if the received signal spectrum S is offset so that its principal energy component lies outside of the passband of the main receiver 1, the output S2 of the auxiliary receiver 2 will exceed the amplitude of the output S1 of the main receiver 1. Now, if both the spectra of the desired signal D and of the spurious signal S are simultaneously introduced into both receivers, the output of the main receiver 1 will still be larger because the main energy components are located squarely within its passband, and the output of the auxiliary receiver 2 will be relatively smaller because none of the main energy components from either spectra lie within the passband of the auxiliary receiver 2, and therefore the latter receiver is passing only low-energy components from both spectra. In the event that the spurious spectrum lies so close to the main spectrum that its principal energy components fall within a passband of the auxiliary receiver 2, the system should then be retuned by moving the magnetron frequency of the transmitter T far enough away from the magnetron frequency of the transmitter within the interfering radar so as to move the principal energy components outside of the two passband humps of the auxiliary receiver 2. The width of the spectrum from a magnetron is quite great, for instance, if the magnetron is tuned to 5600 megacycles, the magnetron splash may extend out 400 megacycles on either side thereof, and therefore a single radar operating in an area causes interference which will affect to a greater or lesser extent nearby radar systems tuned within 400 megacycles on either side of it. If a nearby radar is tuned only 60 megacycles away from this other radar frequency, the energy in the spectrum of a 0.25 microsecond pulse is approximately 36 db down to its receiver. When tuned 120 megacycles away, it is about 42 db down and therefore still represents quite a sizable signal to a receiver which has a sensitivity of —95 dbm. If, therefore, a 5600 megacycle radar receives a magnetron splash from another similar radar, which signal is down 30 to 40 db below its main signal, on this basis, the signal level illuminating the main lobe of the other radar provides a receiver signal of about —50 to —65 dbm, which signals are well within the sensitivity of the receiver. These figures are picked because they are typical, and because they demonstrate the reason why magnetron splash is the principal cause of interference between plural radars operating within an area of a few miles of each other. This —50 to —65 dbm signal was calculated for the case where the two radars are separated by a distance of approximately four miles.

However, where the system is provided with the improved receiver apparatus according to the present invention, at all times when the present radar is not receiving an echo from its own transmitter (assuming the presence of an interfering signal having the center of its spectrum outside of the passband of the main receiver 1) the output of the auxiliary receiver 2 will exceed the output amplitude of the main receiver 1 and therefore the comparator 5 will block the gate 3 and pass no signals to the indicator unit U. On the other hand, if an echo is received from the system's own radar transmitter T, the main energy components of the desired signal spectrum D will fall squarely within the passband of the main receiver 1 and only magnetron splash components of relatively lower energy will fall within the passband of the auxiliary receiver 2. Therefore the output D1 of the main receiver will be greater in amplitude than the output D2 of the auxiliary receiver, and the comparator circuit 5 will render the gate 3 conductive so as to pass the echo signal from the main radar receiver 1 to the indicator unit U. All of this is done without degrading the desired signal amplitude. Thus, the only time that a pulse will appear at the indicator unit will be at a time when a desired signal within the passband of the main receiver 1 appears. At all other times the gate 3 will be blocked and, in a practical embodiment, may comprise a normally blocked gate opened by a suitable control signal from the comparator 5.

Figure 4:
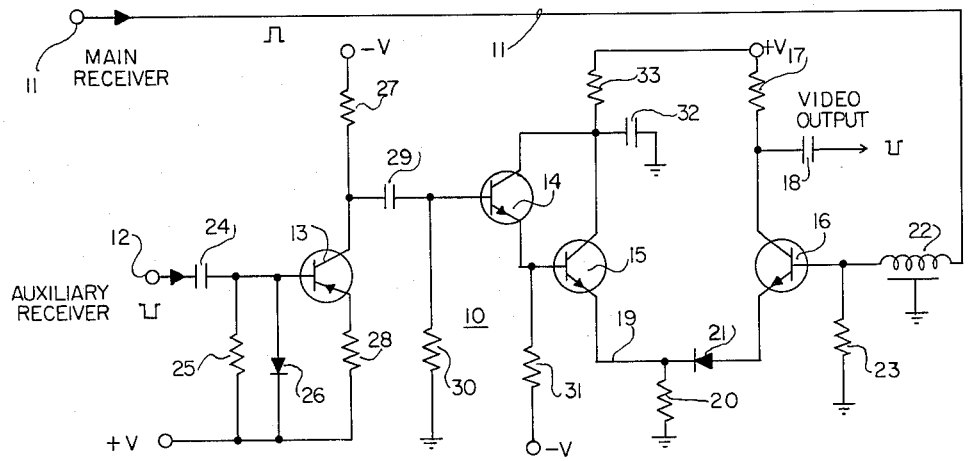
FIG. 4 is a schematic diagram illustrating one practical embodiment of a combined comparator and gating circuit suitable for use in the present invention.

Referring now to FIG. 4, this figure shows a schematic diagram of a combined comparator and gate circuit having circuit values as shown in a table below. The comparator 5 and the gate 3 shown in FIG. 1 comprises standard logical circuits of a type frequently used in computers and other signal processing systems. The combined comparator and gate 10 shown in FIG. 4 comprises a transistor amplifier 16 having two inputs, the upper input 11 being connected with the main receiver 1 and the lower input 12 being connected with the auxiliary receiver.

There are four transistors in this circuit respectively labeled 13, 14, 15, and 16, the latter transistor comprising an amplifier having a load resistor 17 in its collector circuit and having an output through a capacitor 18, which output should be connected directly to the indicator unit U of the radar system. The transistors 14 and 15 are direct-coupled emitter followers.

For the sake of discussion, if the lead 19 is disconnected from the junction of the resistor 20 and the diode 21, then the input from the auxiliary receiver 2 would be disconnected. In this event, transistor 16 would be a single amplifier receiving its input from the main receiver along the lead 11 and passing it through a delay line 22 which merely serves to introduce as much delay into the line 11 as would be provided by the three transistor amplifiers 13, 14, and 15 in series with the input line 12 so as to cancel out any difference in travel time through the circuits 11 and 12 to the output 18. The delay line 22 serves no other function than this. If the wire 19 were disconnected, a signal coming in from the main receiver along wire 11 would pass through the delay 22 and into the base of the transistor 16 which is biased through the resistance 23. If a positive signal were received from the main receiver 1, after amplification in the transistor 16 the output would be a negative signal coupled by the capacitor 18 to the indicator unit U.

On the other hand, if wire 11 were disconnected and the wire 19 reconnected, then an auxiliary signal at the terminal 12 from the auxiliary receiver 2 would pass through the capacitor 24 and would apply a negative signal to the base of the PNP transistor 13, the base being biased by a resistor 24 and a diode 26. Assuming that this input is also negative, the effect will be to cause a greater current to be drawn through the load resistance 27 and therefore a positive-going signal would be passed through the capacitor 29, and would change the bias on the base of the NPN transistor 14 so as to cause it to draw more current through the emitter load resistance 31 which in turn would cause the transistor 15 to draw more current through the emitter resistance 20, thereby increasing the positive bias on the emitter of the transistor 16 and causing it to approach cut-off. In this event, a positive signal would be supplied across the load resistor 17 and through the capacitor 18. Now, if signals are applied from both receivers with the signal applied to the line 11 going in the positive direction at the output 18 and the signal applied at the line 12 going in the negative direction thereat, the video output appearing at the capacitor 18 will represent whichever of these signals is stronger. In other words, one signal drives the transistor 16 in one direction and the other signal drives the transistor 16 in the other direction, so that the video output depends on which signal is stronger. Now, if the indicator unit can display only negative signals, then wherever the auxiliary receiver output applied at line 12 exceeds the amplitude of the main receiver applied at 11, no indication will appear on the indicator unit, but when the main receiver signal applied at 11 is the greater, then the indicator unit will display it. R-C circuit 32–33 is merely a power-supply decoupling expedient. This comparator gate circuit 10 is described by way of illustration, and is not intended to limit the present invention, although the circuit itself is believed to be novel. The reason why the auxiliary receiver is provided with three stages of amplification, whereas the main receiver signal is not, is to provide a system in which the signal from the main receiver is applied to the indicator unit only if it is substantially greater in amplitude than the signal appearing in the auxiliary receiver output. This may be desirable in view of the fact that the output of the main receiver 1 will usually be very much greater than the output of the auxiliary receiver 2 since the main receiver ordinarily receives echoes with their main energy components located squarely in its passband, whereas the auxiliary receiver 2 generally receives very much smaller magnetron splash components, and ordinarily does not receive any signals having their main energy content located squarely within either passband hump of the auxiliary receiver. It may even be desirable to provide gain control means in the auxiliary receiver to permit manual control of the threshold at which the video is blanked due to the presence of interference.

The following table lists circuit values successfully used in a working embodiment of the invention including the circuit illustrated in FIG. 4:

| | |
|---|---:|
| Transistor 13 | 2N1131 |
| Transistor 14 | 2N2219 |
| Transistors 15 and 16 | 2N1711 |
| Resistors 17 and 20, ohms | 470 |
| Capacitors 18, 24, 29 and 32, microfarads | 25 |
| Diodes 21 and 26 | 1N974 |
| Delay line 22, microseconds | 22 |
| Resistor 23, ohms | 430 |
| Resistors 25 and 30, ohms | 10,000 |
| Resistors 27 and 33, ohms | 1,000 |
| Resistor 28, ohms | 330 |
| Resistor 31, ohms | 47,000 |

+V is +18 volts with respect to ground
−V is −18 volts with respect to ground

Figure 5:
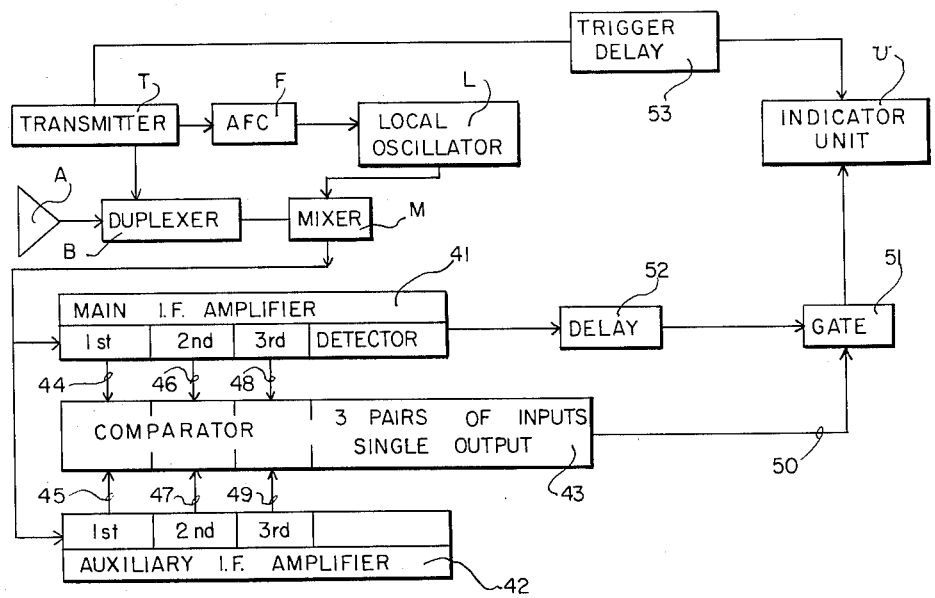
FIG. 5 is a block diagram of a radar system similar to FIG. 1 but modified to include additional advantageous features.

Proceeding now to a description of FIG. 5, this figure also illustrates a radar system having a conventional antenna A connected with a duplexer B which in turn is connected with a transmitter T, and which system also includes a conventional indicator unit U. In the embodiment illustrated in FIG. 5, a local oscillator L is connected with a mixer M, and a conventional automatic frequency control circuit F maintains the tuning of the local oscillator such as to locate a main passband of the receiver squarely at the frequency to which the transmitter is tuned. The system shown in FIG. 5 is a more economical type of system than the one shown in FIG. 1, where it was assumed that the two receivers 1 and 2 were completely separate units.

In the circuit shown in FIG. 5, the front end of the receiver comprising the mixer and local oscillator is common to both receiver means, and the bifurcation of the receiver into two separate receiver means does not occur until the intermediate frequency amplifiers. In this circuit two separate intermediate frequency amplifiers are provided. The bandwidth of the front end of the receiver including the mixer is, of course, broad enough to cover all three humps of the composite passband and the signal separation is accomplished in the separate IF amplifiers, i.e., a main amplifier 41 and an auxiliary amplifier 42. The main I.F. amplifier is sharply tuned to an I.F. frequency differing from the transmitter frequency exactly by the frequency of the local oscillator, so that the main I.F. amplifier 41 when taken with the mixer M and the local oscillator L comprises the main receiver means having a single passband as set forth in the top curves in both FIGS. 2 and 3. On the other hand, the auxiliary I.F. amplifier 42 when taken with the mixer M and local oscillator L provides two separate passbands as shown in the lower set of curves in both FIGS. 2 and 3. This can be accomplished in any well-known manner by simply over-coupling the I.F. amplifier stages and/or tuning them so that they provide upper and lower passbands contiguous with the passband of the main I.F. amplifier 41 and having a notch between their passbands substantially coextensive with the passband of the main receiver means, which includes the I.F. amplifier 41 and the mixer M.

The circuit shown in FIG. 5 also provides another feature of novelty whereby output is taken from several different stages in each of the amplifiers 41 and 42. Assuming for the sake of illustration that these amplifiers have at least three stages in them, an output taken from the first stage of the main I.F. amplifier 41 and an output taken from the first stage of the auxiliary amplifier 42 will both be at fairly low signal levels and will not tend to be saturated signals even in the presence of fairly large input signals to the mixer. Thus, if these two signals enter the comparator 43 by way of lines 44 and 45, even though they result from rather large input signals to the mixer, a difference can be seen therebetween since they will not both be saturated, and preferably neither will be saturated. On the other hand, if the signals entering the mixer M are not of very large amplitude, but are intermediate in amplitude, the signals taken from later I.F. amplifier stages, for example, the second I.F. stages can be introduced into the comparator along lines 46 and 47, and a sufficient amplitude will be obtained that a comparison of these two levels can be had, whereas, with these smaller input signals, the levels appearing in the lines 44 and 45 would be too small in amplitude to permit convenient comparison. Furthermore, if the input signal to the mixer M is quite small, then it may be desirable to go to a still later stage in each I.F. amplifier, for example a third stage, and take two signals along the leads 48 and 49 to the comparator. Thus, signals of adequate size to permit ready comparison can be obtained at the lines 48 and 49 when the input signals to the mixer are so small that the output signals at the leads 44, 45, 46, and 47 would be too small for convenient comparison. Also, in this way signals which are saturated in later stages can be avoided by comparing unsaturated signals from earlier stages.

Comparison at all three of these levels would ordinarily be simultaneously made. Moreover, it is not necessary that the comparison be made between actual signal components. Secondary variables can be used for signal-level comparison, for example, by comparison of AGC voltage levels in both receiver means. As many pairs of different-level outputs can be taken from the main and auxiliary I.F. amplifiers as are necessary to reasonably cover the anticipated input signal levels and avoid saturation at all of the pairs of outputs compared.

The comparator circuit shown in FIG. 5 requires only a single output 50 to the gate 51, this output 50 being controlled by whichever of the pairs of inputs to the comparator provides the best comparison in amplitude at any particular moment of time. The gate is rendered conductive when one of the outputs of the main I.F. amplifier 41 exceeds the corresponding output of the auxiliary I.F. amplifier 42, and the gate 51 is blocked by the signal on the output 50 whenever the output of the I.F. amplifier 42 exceeds the output of the amplifier 41. The comparator 43, for example, could comprise three separate flipflops each controlled by one pair of wires 44–45, 46–47, or 48–49, and these flipflops being all coupled to the output line 50 by separate coupling diodes so that if any one of the flipflops is flopped to an "on" condition it will supply an "on" signal to the wire 50 through its coupling diode.

Inasmuch as the comparator will introduce a small amount of delay in supplying an output 50 in response to an input along one set of leads 44–49 inclusive, it is desirable to add a delay circuit 52 so as to keep the detected video output of the main I.F. amplifier 41 in step with the control output 50 from the comparator. Moreover, having supplied such a delay in the video circuit, it is then desirable to supply a corresponding delay in the trigger circuit lead from the transmitter T to the indicator unit U, this delay being supplied by the trigger delay unit 53 for the same amount of delay as is introduced by the delay unit 52 and by the functioning of the comparator unit 43.

The above specific embodiments comprise only illustrative circuits, and the breadth of the invention is not to be limited thereby, for obviously, changes can be made within the scope of the following claims.

I claim:
1. A receiver system comprising,
 (a) main receiver means having a main passband tuned to a center frequency, and having a first output proportional to the energy received within said main passband,
 (b) auxiliary receiver means having a substantially broader tuned passband with a notch therein substantially coextensive with said main passband, and the composite width of the broader passband being substantially greater than said main passband, and having a second output proportional to the composite energy received within said broader passband, and
 (c) gating means coupled to said first output and delivering an output signal when a signal appears thereat and when the gating means is conductive, and the gating means being coupled to said second output and including means for comparing the energy level of said outputs and rendering the gate means conductive when the first output level exceeds the second output level, and for blocking it when the second output level exceeds the first output level.
2. In combination with a radar system including an antenna and a main receiver coupled thereto and having an intermediate amplifier with a main passband tuned to the frequency of the radar transmitter, and the receiver having a first output proportional to the energy received within the main passband, interference rejection means including
 (a) auxiliary intermediate amplifier means coupled to the receiver and having a substantially broader passband with a notch therein substantially coextensive with said main passband, and having a second output, proportional to the energy received within said broader passband,
 (b) gating means coupled to said first output and delivering a corresponding signal when a signal appears thereat and when the gating means is conductive, and the gating means being coupled to said second output and including means for comparing the energy levels of said outputs and rendering the gate conductive when the first output exceeds the second output and for blocking it when the second output exceeds the first output, and
 (c) automatic frequency control means connected to the main receiver and to the transmitter for maintaining the main passband and said notch both tuned to the frequency of the transmitter.
3. In a system as set forth in claim 1, said gating means comprising
 (a) an amplifier having an output circuit comprising the output of the gating means, and having two input circuits, the main receiver means being connected to one input circuit to drive the amplifier to amplify its output,
 (b) means for amplifying the output of the auxiliary receiver means, and connecting it to the other input circuit with a polarity tending to drive said amplifier toward cut-off, and (c) delay means interposed between the main receiver means and said one input circuit and interposing the same time delay as is introduced by said means for amplifying the output of the auxiliary receiver means.

4. A receiver system for passing desired signals having their center frequencies located within a main passband of the system and for discriminating against spurious signals having their highest-energy frequencies located outside of the main passband but having interfering components located within and near the passband of the receiver system, comprising (a) main receiver means having a relatively narrow passband tuned to the center frequency of the desired signals and having plural signal amplifier stages, (b) auxiliary receiver means having plural signal amplifier stages and having a relatively broader passband disposed about the same center frequency and said broader passband having a notch in its pass characteristic located at said center frequency, (c) comparator means having plural inputs corresponding with said plural amplifier stages and coupled with both receiver means for continuously and separately comparing the relative signal energy levels at successive stages in both receiver means and for delivering a control signal representing whichever of the receiver means signal levels is greater at any of said stages, and (d) gating means coupled with the main receiver to pass the output therefrom when the gating means is conductive, and coupled to the comparator means to be rendered conductive by its control signal when a signal level in a stage of the main receiver means is greater than that of the corresponding stage of the auxiliary receiver means.

5. A pulse-receiver system for passing desired pulse signals having their principal frequencies located within a main passband of the system and for discriminating against spurious signals having their highest-energy frequencies located outside of the main passband but having spectra of frequencies including interfering frequencies located near to and extending into said passband, comprising (a) main pulse-receiver means having a relatively narrow passband tuned to said principal frequency of the desired pulses, (b) auxiliary receiver means having a relatively much broader tuned passband disposed on either side of said principal frequency, and said broader passband having a notch in its pass characteristic located at said principal frequency and coextensive with said narrow passband, and (c) gating means coupled with the main receiver means to deliver a pluse output when the gating means is conductive and a pulse appears in the main receiver means, and the gating means being further coupled to the auxiliary receiver means and having means for comparing the energy levels of both receiver means and operative to be rendered conductive during instants when the output level of the main receiver means is greater than that of the auxiliary receiver means and to be rendered non-conductive when the output level of the auxiliary receiver means exceeds that of the main receiver means.

6. In a system as set forth in claim 5, said gating means comprising (a) an amplifier having an output circuit comprising the output of the gating means, and having two input circuits, the main receiver means being connected to one input circuit to drive the amplifier to amplify its output, (b) means for amplifying the output of the auxiliary receiver means, and connecting it to the other input circuit with a polarity tending to drive said amplifier toward cut-off, and (c) delay means interposed between the main receiver means and said one input circuit and interposing the same time delay as is introduced by said means for amplifying the output of the auxiliary receiver means.

7. A radar system including a receiver for passing desired signals having their center frequencies located within its narrow tuned passband and constituting echoes from the radar transmitter as received at its antenna, and said system eliminating spurious signals having their highest-energy frequencies located outside of said narrow passband but having spectra of frequencies, including interfering frequencies extending into said passband, comprising (a) auxiliary receiver means coupled to said antenna and having a passband substantially broader than said narrow passband and disposed about the same center frequency, and said broader passband having a notch in its pass characteristic located at and substantially coextensive with said narrow passband, and (b) comparator and gating means coupled with the main receiver to deliver an output radar signal in response to a main receiver signal and when the gating means is conductive, and the comparator and gating means being further coupled to the auxiliary receiver means to compare the energy level in the two receiver passbands and operative to be rendered conductive when the level of the main receiver is greater than that of the auxiliary receiver means and to be rendered non-conductive when the level of the auxiliary receiver means exceeds that of the main receiver.

8. In a receiver system for passing to its output desired signals having their center frequencies located within a main passband of the system, and for rejecting spurious signals having their highest-energy frequencies located outside of the main passband but having interfering frequencies extending into said passband, (a) a first tuned signal-amplifying path having a narrow passband tuned to said center frequency and delivering a first output proportional to the level of energy received within said narrow passband, (b) a second tuned signal-amplifying path having two separate passbands contiguously located on opposite sides of said narrow passband and separated substantially by the width thereof, the composite bandwidth of said two passbands substantially exceeding that of said narrow passband, and the second amplifying path delivering a second output proportional to the composite level of energy received within said two passbands, (c) gate means connected to the output of the first path and connecting this path to the output of the receiver when the gate means is conductive, and the gate means including means for controlling its conductivity, and (d) means connected to said paths for comparing the first and the second output levels, and connected with said controlling means to render the gate means non-conductive whenever the second level exceeds the first.

References Cited by the Examiner
UNITED STATES PATENTS

| | | | |
|---|---|---|---|
| 2,183,714 | 12/1939 | Franke | 325—477 X |
| 2,995,653 | 8/1961 | Burgess | 325—478 X |
| 3,056,087 | 9/1962 | Broadhead et al. | 325—478 |
| 3,125,755 | 3/1964 | Williams | 325—324 X |

DAVID G. REDINBAUGH, *Primary Examiner.*

KATHLEEN H. CLAFFY, CHESTER L. JUSTUS,
*Examiners.*